(12) United States Patent
Bankston et al.

(10) Patent No.: US 12,131,323 B2
(45) Date of Patent: Oct. 29, 2024

(54) DIGITAL TICKET SYSTEM AND METHOD

(71) Applicant: Visa International Service Association, San Francisco, CA (US)

(72) Inventors: Michael Steven Bankston, Oakland, CA (US); Erik Christopher Friend, Mountain View, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 589 days.

(21) Appl. No.: 17/277,970

(22) PCT Filed: Sep. 20, 2019

(86) PCT No.: PCT/US2019/052212
§ 371 (c)(1),
(2) Date: Mar. 19, 2021

(87) PCT Pub. No.: WO2020/061488
PCT Pub. Date: Mar. 26, 2020

(65) Prior Publication Data
US 2021/0350369 A1   Nov. 11, 2021

(51) Int. Cl.
*G06Q 20/40*    (2012.01)
*G06Q 20/04*    (2012.01)
*G06Q 20/38*    (2012.01)

(52) U.S. Cl.
CPC ......... *G06Q 20/401* (2013.01); *G06Q 20/045* (2013.01); *G06Q 20/38* (2013.01)

(58) Field of Classification Search
CPC .... G06Q 20/401; G06Q 20/045; G06Q 20/38; G06Q 20/387; G06Q 20/0457; G06Q 20/40; G06Q 20/405; G06Q 30/0207
See application file for complete search history.

(56) References Cited

U.S. PATENT DOCUMENTS

| 9,338,658 | B1* | 5/2016 | Gailloux | H04W 12/12 |
| 2011/0302017 | A1* | 12/2011 | Marti | G06Q 30/0225 |
| | | | | 705/14.26 |

(Continued)

FOREIGN PATENT DOCUMENTS

| CN | 101641709 A | 2/2010 |
| CN | 104798092 A | 7/2015 |

(Continued)

OTHER PUBLICATIONS

Application No. PCT/US2019/052212, International Search Report and Written Opinion, Mailed On Jan. 13, 2020, 11 pages.

(Continued)

*Primary Examiner* — Patrick McAtee
*Assistant Examiner* — Nakia Leffall-Allen
(74) *Attorney, Agent, or Firm* — Kilpatrick Townsend & Stockton LLP

(57) ABSTRACT

Disclosed are methods and systems for enabling an assertion to be provided to a relying entity that is associated with a discount or digital coupon for an item in a transaction. The assertion may indicate an interaction by a user device with a digital indicator associated with the item and/or a resource provider offering the item. The assertion may be associated with a user and redeemed at a later time to apply a discount for an item involved in a transaction. The assertion may indicate an interaction with a digital indicator at one location for an item and redeemed at another location, including an online transaction, for the same item.

20 Claims, 5 Drawing Sheets

(56) References Cited

U.S. PATENT DOCUMENTS

| | | | |
|---|---|---|---|
| 2011/0307318 A1* | 12/2011 | LaPorte | G06Q 20/387 |
| | | | 705/14.27 |
| 2013/0091003 A1* | 4/2013 | Crum | G06Q 30/0207 |
| | | | 705/14.26 |
| 2013/0139224 A1* | 5/2013 | Wehmeier | G06F 21/552 |
| | | | 726/4 |
| 2015/0254704 A1* | 9/2015 | Kothe | G06Q 30/0261 |
| | | | 705/14.26 |
| 2015/0356560 A1 | 12/2015 | Shastry et al. | |
| 2015/0379552 A1* | 12/2015 | Kent | G06Q 20/202 |
| | | | 705/14.38 |
| 2016/0232527 A1 | 8/2016 | Patterson | |
| 2017/0250972 A1* | 8/2017 | Ronda | H04L 9/0891 |
| 2018/0198876 A1 | 7/2018 | Ma et al. | |

FOREIGN PATENT DOCUMENTS

| | | | |
|---|---|---|---|
| CN | 107430731 A | 12/2017 | |
| WO | 2013049844 A2 | 4/2013 | |
| WO | 2018129308 A1 | 7/2018 | |

OTHER PUBLICATIONS

Office Action, mailed Apr. 20, 2024, Chinese Patent Application No. CN201980061311.X, 16 pages.

\* cited by examiner

DIGITAL TICKET SYSTEM AND METHOD

CROSS-REFERENCE TO RELATED APPLICATIONS

This application is the U.S. National Stage application of PCT/US2019/052212, filed Sep. 20, 2019, which claims the benefit of priority from U.S. Provisional Application No. 62/733,868, filed Sep. 20, 2018, the disclosures of which are incorporated herein by reference in their entirety.

BACKGROUND

In some instances, it is difficult to know if a particular person is using a resource provider's physical store to evaluate goods or services, only to purchase the goods or services at a different resource provider online or otherwise. While it might be possible track the location of a particular user's activity through electronic device tracking or other means, this is not particularly desirable due to privacy concerns.

Embodiments of the invention address these and other problems, individually and collectively.

BRIEF SUMMARY

One embodiment of the disclosure is directed to a method comprising: receiving, by a server computer and from a target entity computer, a first request to form an assertion of a target entity associated with the target entity computer and a resource provider, the assertion including an identity of the target entity and a location of the resource provider, the first request generated in response to an interaction of the target entity computer and a digital indicator associated with the resource provider; generating, by the server computer, the assertion including an identity attribute for the target entity based at least in part on the first request, the identity attribute including the identity of the target entity and the interaction of the target entity computer and the digital indicator associated with the resource provider; receiving, by the server computer and from a relying entity computer, a second request for the identity attribute associated with the target entity for a transaction associated with a relying entity associated with the relying entity computer and the target entity, the second request including: a first identifier of the relying entity; a second identifier associated with the target entity; and an item identifier for an item associated with the transaction; determining, by the server computer, an assertions model based at least in part on the first identifier and the second identifier in response to receiving the second request; retrieving, by the server computer, the identity attribute based at least in part on the assertions model and one or more domain restrictions for the assertion; and transmitting, by the server computer and to the relying entity computer, a ticket based at least in part on retrieving the identity attribute.

In embodiments, the ticket is utilized by the relying entity to complete the transaction. The ticket can include a digital coupon for the item. In embodiments, the one or more domain restrictions includes at least one of prohibiting the use of the ticket to a specific resource provider, prohibiting the use of the ticket to the specific resource provider and a specific item, restricting use of the ticket to one or more resource providers specified by an entity, or restricting use of the ticket to a certain time period. In embodiments, the method further includes transmitting, by the server computer and to a resource provider computer associated with the resource provider, a notification of usage of the assertion in response to receiving the ticket from the relying computer.

In embodiments, the notification includes the resource provider, the location of the resource provider, the item identifier, and the identity of the target entity. In embodiments, the method further includes transmitting, by the server computer and to the relying entity computer, a payment token that corresponds to a discount for the item in the transaction in response to receiving the ticket from the relying entity computer. In embodiments, the second identifier associated with the target entity is maintained and provided in the second request by an application of the target entity computer. In embodiments, the method further includes transmitting, by the server computer and to the target entity computer, a notification that identifies generation of the assertion with the resource provider. In embodiments, the assertion is prohibited from being utilized by another entity.

Another embodiment of the disclosure is directed to computer system comprising: a processor; and a memory element including instructions that, when executed with the processor, cause the system to perform the above-described method.

In embodiments, the digital indicator includes a quick response (QR) code. In embodiments, the computer system implements an assertions model manager. In embodiments, the assertions model manager utilizes an application programming interface (API) to receive the first request and the second request. In embodiments, the second identifier associated with the target entity includes the identity of the target entity. In embodiments, the one or more domain restrictions are specified by the resource provider. In embodiments, the location of the resource provider includes a geographical location of the resource provider. In embodiments, the second identifier associated with the target entity is maintained and provided in the second request by an application of the target entity computer. In embodiments, the identity attribute is retrieved from a digital identity provider.

Another embodiment of the disclosure is directed to a non-transitory computer readable storage medium having stored thereon instructions that, when executed by a computer system, cause the computer system to perform the above described method.

DETAILED DESCRIPTION

Figure 1:
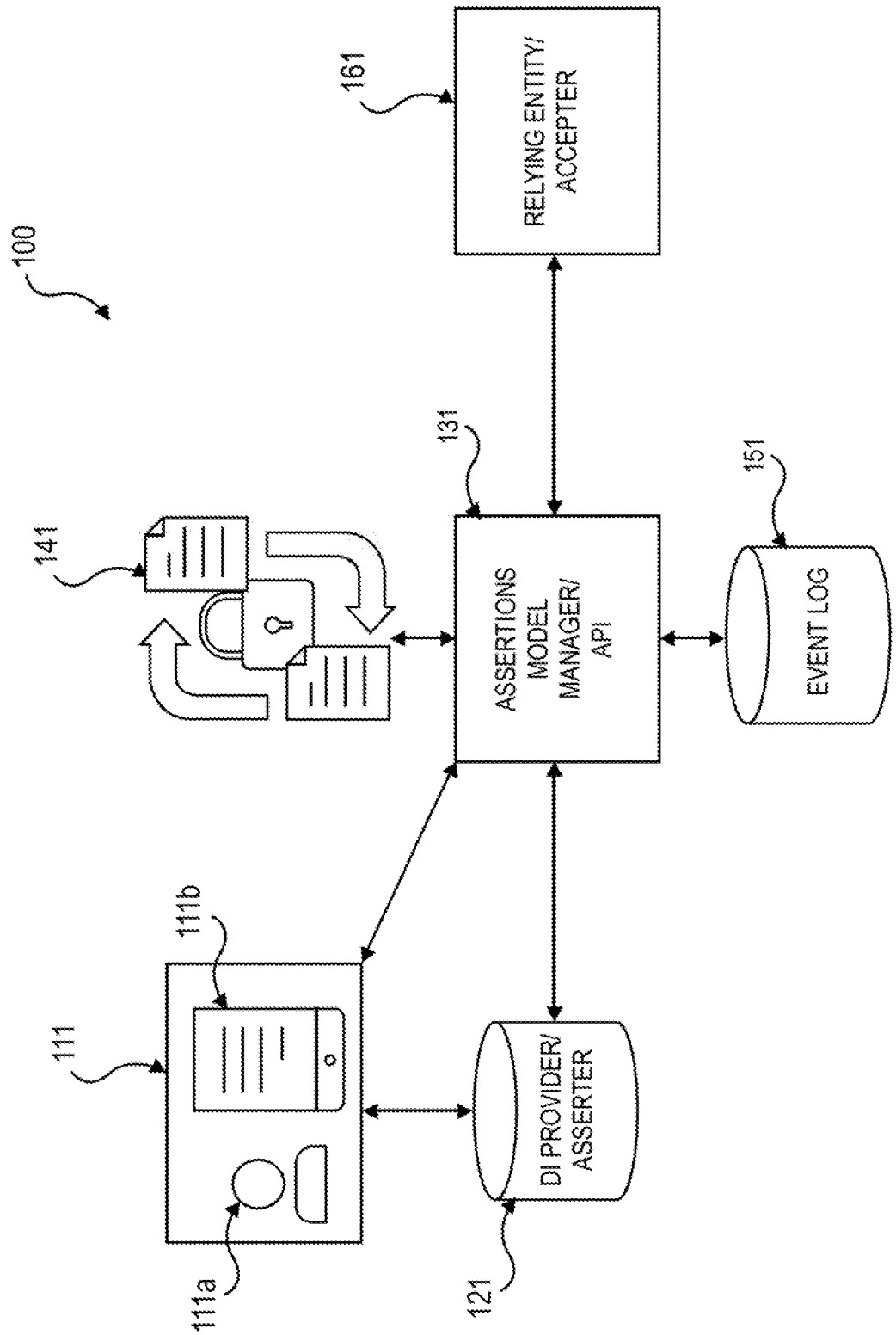
FIG. 1 is a schematic diagram of a system for providing at least one assertion according to an embodiment.

An "issuer institution," "portable financial device issuer," "issuer," or "issuer bank" may include one or more entities that provide accounts to customers for conducting transactions (e.g., payment transactions), such as initiating credit and/or debit payments. For example, an issuer institution may provide an account identifier, such as a personal account number (PAN), to a customer that uniquely identifies one or more accounts associated with that customer. The account identifier may be embodied on a portable financial device, such as a physical financial instrument (e.g., a payment card), and/or may be electronic and used for electronic payments. In some embodiments, an issuer institution may be associated with a bank identification number (BIN) that uniquely identifies the issuer institution. An "issuer institution system" may include one or more computer systems operated by or on behalf of an issuer institution, such as a server executing one or more software applications. For example, an issuer institution system may include one or more authorization servers for authorizing a transaction.

An "account identifier" may include one or more types of identifiers associated with a user account (e.g., an account identifier, a PAN, a card number, a payment card number, an account token, and/or the like). In some embodiments, an issuer institution may provide an account identifier (e.g., a PAN, an account token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some embodiments, the account identifier may be an original account identifier, where the original account identifier was provided to a user at the creation of the account associated with the account identifier. In some embodiments, the account identifier may be an account identifier (e.g., a supplemental account identifier) that is provided to a user after the original account identifier was provided to the user. Account identifiers may be alphanumeric, any combination of characters and/or symbols, and/or the like.

An "account token" may include an identifier that is used as a substitute or replacement identifier for an account identifier, such as a PAN. An account token may be used as a substitute or replacement identifier for an original account identifier, such as a PAN. Account tokens may be associated with a PAN or other original account identifier in one or more data structures (e.g., one or more databases and/or the like) such that they may be used to conduct a transaction without directly using the original account identifier. In some embodiments, an original account identifier, such as a PAN, may be associated with a plurality of account tokens for different individuals or purposes. In some embodiments, account tokens may be associated with a PAN or other account identifiers in one or more data structures such that they can be used to conduct a transaction without directly using the account identifier, such as a PAN. In some examples, an account identifier, such as a PAN, may be associated with a plurality of account tokens for different uses or different purposes.

A "resource provider" may include one or more entities (e.g., operators of retail businesses) that provides goods and/or services, and/or access to goods and/or services, to a user (e.g., a customer, a consumer, and/or the like) based on a transaction, such as a payment transaction. A "resource provider computer" may include one or more computer systems operated by or on behalf of a resource provider, such as a server executing one or more software applications.

A "product" may include one or more goods and/or services offered by a resource provider. An example of a resource provider may include a merchant.

A "transaction service provider" may include an entity that receives transaction authorization requests from merchants or other entities and provides guarantees of payment, in some cases through an agreement between the transaction service provider and an issuer institution. For example, a transaction service provider may include a payment network such as Visa®, MasterCard®, American Express®, or any other entity that processes transactions. As used herein "transaction service provider system" may include one or more computer systems operated by or on behalf of a transaction service provider, such as a transaction service provider system executing one or more software applications. A transaction service provider system may include one or more processors and, in some embodiments, may be operated by or on behalf of a transaction service provider.

A "client" and "client device" may include a device that can communicate with a server computer. As an example, a "client device" may include one or more POS devices and/or POS systems used by a merchant. It will be appreciated that a client device may be any electronic device configured to communicate with one or more networks and initiate or facilitate transactions such as, but not limited to, one or more computers, portable computers, tablet computers, cellular phones, wearable devices (e.g., watches, glasses, lenses, clothing, and/or the like), PDAs, and/or other like devices.

A "server" may include one or more computing devices, such as processors, storage devices, and/or similar computer components that communicate with client devices and/or other computing devices over a network, such as the Internet or private networks.

An "identifier" may include any information that may be used to identify something. In some embodiments, the identifier may be a special value generated randomly or according to a predetermined algorithm, code, or shared secret. For example, an individual may be identified using a driver's license number or a cryptographic key. In some embodiments, the identifier may be in the form of one or more graphics, a token, a bar code, a quick response (QR) code, or any other information that may be used to uniquely identify an entity. In some embodiments, the identifier may be in the form of an alpha-numeric string that corresponds to a user's name or a resource provider's name.

An "identity attribute" may include a particular piece of information about an entity (e.g., person, organization, thing, or the like). Examples of identity attributes include a name or other unique identifier, social security number, an age, a phone number, and a bank account number associated with a person.

A "digital identity" (DI) may include a secure set of information about an entity (e.g., a person, organization, or thing). A DI may comprise a plurality of identity attributes, as well as a digital identity identifier that identifies the digital identity. For example, a DI for a user, Joe Smith, may include identity attributes such as the user's date of birth, social security number, address, and driver's license number, as well as an identifier such as Joe_Smith_1234 which is used to identify Joe Smith's digital identity or corresponds to the identity of a user such as Joe Smith. The DI may be made available to another entity in a secure manner. DIs may rely on agreements among stakeholders and security measures such as cryptography.

An "assertion" (sometimes referred to as an "assertion value") may include a secure fact about an entity. An assertion can protect information while being useful to achieve a particular goal. For example, an assertion may specify something about an entity, such as whether the entity should be allowed to purchase alcohol in a particular location. The assertion may be "Jane Doe is old enough to purchase alcohol in California." This assertion can be used by a bar in its decision to serve alcohol to a person, instead of conveying the person's driver's license information to the bar. As another example, an assertion may specify whether an entity has an account which can accept deposits (e.g., "Jane Doe has a bank account and can accept deposits."). As another example, an assertion may specify whether an entity has interacted with a digital indicator associated with a resource provider. The assertion may be "Jane Doe has used a mobile phone to scan a QR code provided by a resource provider."

A "type of assertion" may be a category of assertions, e.g., whether an entity has at least $100 in a bank account. The "assertion" or "assertion value" associated with the type of assertion may be a corresponding answer for a particular entity, which may in the form of "yes" or "no," or may be an affirmative statement (e.g., "Jane Doe has $100 or more in her bank account," or "Jane Doe has interacted with a digital indicator provided by a resource provider."). An assertion may be secured cryptographically. An assertion may be digitally signed by the entity of interest and/or the trusted party providing the secure facts.

An "assertions model" may be a set of assertion types that may be associated with a particular entity. An assertions model may specify one or more types of assertions. For example, an assertions model may include two types of assertions: whether an entity is old enough to rent a car and whether the entity has a valid driver's license. An assertions model may be tailored to a particular situation. Continuing with the previous example, whether an entity is old enough to rent a car and whether the entity has a valid driver's license may correspond to an assertions model for the context of a prospective car renter interacting with a rental car agency. An assertions model may further specify a set of identity attributes. As another example, the assertions model may include a single type of assertion such as "Did the entity interact with a digital indicator provided by a resource provider?" The assertions model can be used in the context of issuing a digital coupon on behalf of an entity for use in a subsequent transaction that is in response to the entity interacting with a digital indicator provided by a resource provider.

A "target entity" may include an entity corresponding to an assertion, DI, and/or identity attribute. For example, a target entity may be Mary Jones. An assertion about Mary Jones may specify whether Mary Jones is old enough to purchase alcohol in a particular location. A related identity attribute for Mary Jones may be Mary Jones's exact age (e.g., 35 years old). To continue the example, the assertion about Mary Jones may be that she interacted with a digital indicator provided by a resource provider at a specific location. A related identity attribute for Mary Jones may be Mary Jones's identifier (e.g., name or other identifier such as Mary_Jones_1234). As used herein, a "target entity computer" may refer to one or more computer systems operated by or on behalf of a target entity, such as a mobile computer device executing one or more software applications. A target entity may be referred to as a user and a target entity computer may be referred to as a user device.

A "relying entity" may include an entity that may receive an assertion, DI, and/or identity attribute. For example, the relying entity may be a bar that requests an assertion whether a target entity is old enough to be served alcohol. In some embodiments, a relying entity may be a resource provider or merchant. A "relying entity computer" may include one or more computer systems operated by or on behalf of a relying entity (e.g., a resource provider).

A "ticket" may include an element that allows a holder the right to obtain something such as a discount or value. In some embodiments, a ticket may include an element for use in accessing a digital coupon or prepaid card for use in a payment and settlement process to complete a transaction by a resource provider. A ticket may represent the issuance of a digital coupon or prepaid card for a specific target entity for use in completing a transaction with a relying entity, such as a resource provider, in response to the target entity interacting with a digital indicator provided by a resource provider (which may be the same or a different resource provider). In embodiments, the ticket may be transmitted by a relying entity to a payment processing network to receive monetary payment for completing a transaction.

A "key" may include to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

Embodiments of the present invention are can include systems, methods, and computer program products for providing at least one assertion regarding an entity including whether the entity is eligible for any relevant tickets for use in completing a transaction with a relying entity.

Referring now to FIG. 1, a schematic diagram of an example system 100 for providing at least one assertion is shown according to an embodiment. The system 100 can include at least one digital identity (DI) provider 121. For example, the DI provider can be a an issuer, an acquirer, a transaction service provider, a government agency, and/or the like able to create and store DIs. The DI provider 121 can be in communication with at least one entity 111 to create and store a DI associated with the entity 111, as described herein. The entity 111 can include a user 111a and/or a client device 111b of the entity. As used herein, the term "entity" may include to an individual (e.g., a customer, a consumer, and/or the like), a business or other legal organization, a government agency, and/or the like. Additionally or alternatively, the term "entity" may include to a thing (e.g., an object, a piece of equipment, an electronic component, a computer system, and/or the like). The entity 111 can include a target entity.

In some embodiments, the DI provider 121 and/or the entity 111 can be in communication with an assertions model manager 131. For example, communication with the assertions model manager 131 can be direct, indirect, via a network such as the Internet, and/or via an application programming interface (API), as described herein. The assertions model manager 131 can maintain and store (e.g., in a database and/or the like) assertions models for making assertions about the entity 111. For example, each assertions model can be standardized and/or canonical such that information from various DI providers 121 about various entities 111 can be organized into a set of assertions that is uniform regardless of the DI provider 121 or source of the information, as described herein. Additionally or alternatively, each assertions model can be based on the domain in which the assertions model is intended to be used or a type of relying entity 161 requesting assertions about the entity, as described herein. In embodiments, the assertions model manager 131 may be implemented by a server computer.

In some embodiments, the assertions model manager 131 can include and/or be in communication with a ledger of assertions 141 and/or an event log 151. The ledger of assertions 141 and the event log 151 each can be stored in any suitable computer-readable storage medium and/or any suitable combination of computer-readable storage media. For example, the ledger of assertions 141 and/or the event log 151 can be stored in a database. Additionally or alternatively, the ledger of assertions 141 and/or the event log 151 can be maintained and stored in a distributed ledger, including but not limited to a blockchain and/or the like. For purpose of illustration and not limitation, with reference to FIG. 1, the ledger of assertions 141 is depicted as a distributed ledger and the event log 151 is depicted as a database.

In some embodiments, the assertions model manager 131 can be in communication with a relying entity 161. For example, communication with the assertions model manager 131 can be direct, indirect, via a network such as the internet, and/or via an API, as described herein. The relying entity 161 can be any entity requesting information (e.g., assertions) about the entity 111, as described herein. For example, the relying entity 161 can be a resource provider requesting information (e.g., assertions) about the entity 111 purporting to be a customer of the merchant with respect to a payment transaction. Additionally or alternatively, the relying entity 161 can be an entity (e.g., a government agency or business organization) requesting information (e.g., assertions) about the entity 111 with respect to a non-payment interaction (e.g., granting the entity 111 access to a secured area or event venue).

Figure 2:
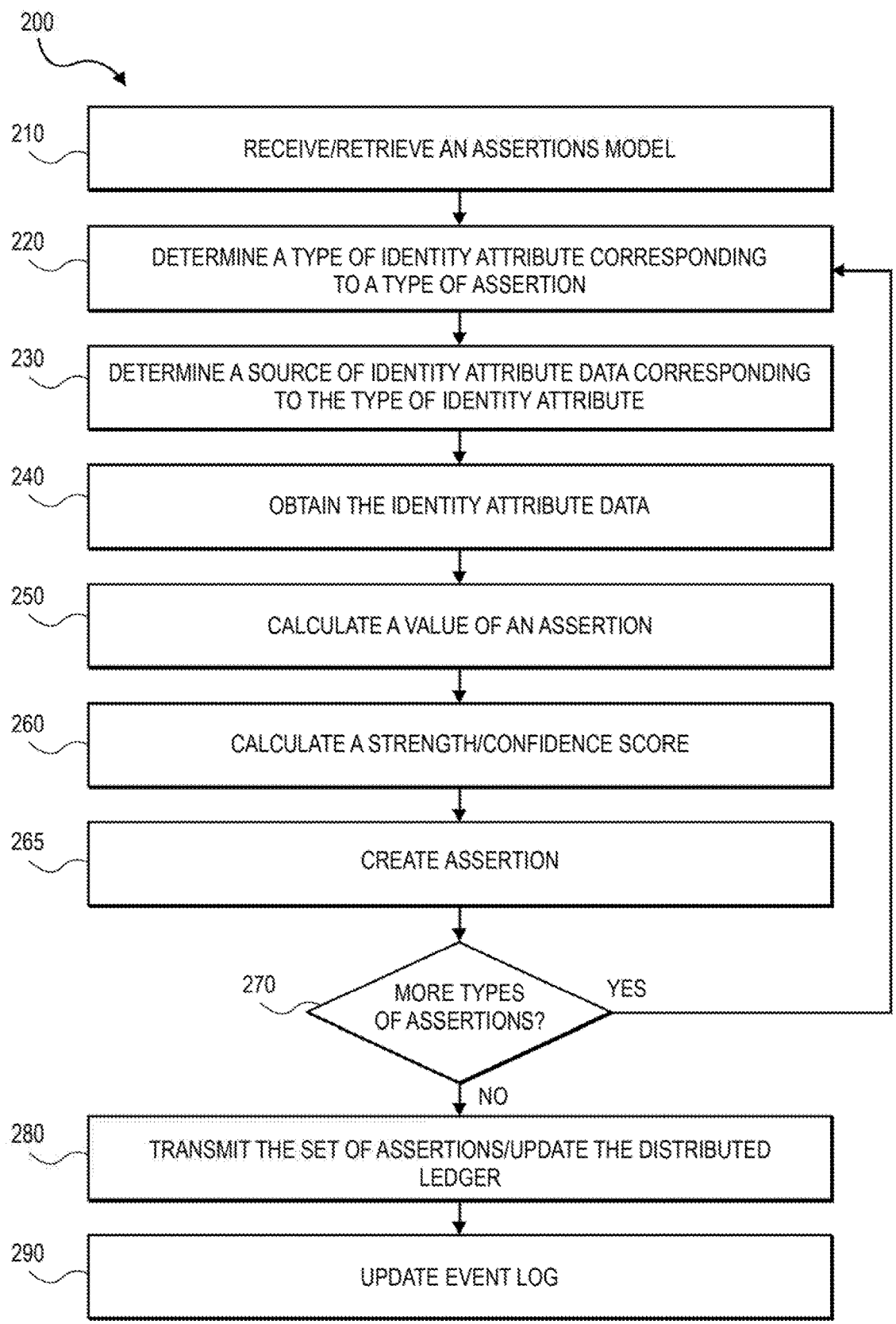
FIG. 2 is a flow diagram for a method of providing at least one assertion according to an embodiment.

Referring now to FIG. 2, a flow diagram of a method 200 for providing at least one assertion is shown according to an embodiment. The exemplary system 100 of FIG. 1 can be discussed with reference to the exemplary method 200 of FIG. 2. At 210, an assertions model can be received or retrieved. For example, the assertions model manager 131 can retrieve or obtain data associated with the assertions model from a database. Additionally or alternatively, the assertions model manager 131 can receive the data associated with the assertions model over a network from an external data storage, including but not limited to a database, a distributed ledger, a blockchain, and/or the like. For purpose of illustration and not limitation, the assertions model can be a standardized and/or canonical assertions model for a relevant domain, which may be determined based on the entity 111 about which assertions will be made, the DI provider 121 from which the DI data will be obtained to make the assertions, and/or the relying entity 161 that is requesting the assertions. For example, before retrieving or receiving the assertions model, the assertions model manager 131 can receive data associated with an identifier of the entity 111, the DI provider 121, and/or the relying entity 161 and determine the relevant domain/assertions model based on the received identifier(s). In some embodiments, the identifier can include data associated with a digital signature and/or cryptographic key of the entity 111, the DI provider 121, and/or the relying entity 161, respectively.

In some embodiments, the assertions model can include at least one type of assertion. For example, the assertions model can include a set of assertion types sufficient to be considered "well formed" for the relevant domain. Additionally or alternatively, the assertions model can include data associated with additional identification, including but not limited to a name/identifier and current version number of the assertions model, and the date on which the assertions model was last updated.

For each type of assertion of the assertions model, at 220, a type of identity attribute corresponding to the type of assertion can be determined. For example, the assertions model manager 131 can determine which type(s) of identity attribute(s) available from the DI provider 121 correspond to each type of assertion in the assertions model. For example, if the relying entity 161 is a merchant that rents automobiles, a type of assertion in the assertions model is whether the entity 111 is old enough to rent an automobile in the country where the relying entity 161 is located, and a type of identity attribute available from the DI provider 121 is a date of birth of the entity 111, then the assertions model manager 131 can determine that the date of birth type of identity attribute corresponds to such a type of assertion. For example, if the relying entity 161 is a resource provider or merchant that is inquiring about the eligibility for digital coupons on behalf of entity 111, then the assertions model manager 131 can determine that the interaction with a digital indicator associated with a resource provider by the entity 111 type of identity attribute corresponds to such a type of assertion. Stated differently, the assertions model may include an assertion type such as "Did the target entity interact with a digital indicator at a resource provider A?." An assertion associated with this assertion type may be "Target entity B interacted with the digital indicator at the resource provider A."

For each type of assertion of the assertions model, at 230, a source of identity attribute data corresponding to the type of identity attribute can be determined. For example, the assertions model may further include a list of valid sources of information for the types of assertions contained therein. Additionally or alternatively, a list of valid sources of information associated with one or more assertions models can be maintained and stored, as described herein. For purpose of illustration and not limitation, referring to the exemplary situation of asserting whether an entity 111 is old enough to rent an automobile as described above, a list of valid sources of date of birth information can include government documents (e.g., a driver's license, birth certificate, passport, and/or the like), a government database, business organization records (e.g., of an issuer, a transaction service provider, and/or the like), and/or the like. Additionally or alternatively, a verification method for verifying the type of identity attribute can be included in the list of valid sources and/or communicated by the DI provider 121. For example, the verification method can include inspection of documentation by the DI provider 121, verification by a business organization (e.g., a third party service), and/or verification by a government agency.

For each type of assertion of the assertions model, at 240, identity attribute data associated with the entity corresponding to the type of identity attribute can be obtained. For example, the assertions model manager 131 can communicate with the DI provider 121 to obtain the identity attribute data associated with the entity 111 corresponding to the type(s) of identity attribute(s) in the assertions model. The DI provider 121 can provide the identity attribute data, which can include the data associated with the entity 111 corresponding to the type of identity attribute and/or additional data associated therewith, including but not limited to the source of the data, as described herein. For example, referring to the exemplary situation of asserting whether an entity 111 is old enough to rent an automobile as described above, the identity attribute data associated with the date of birth may be a numerical representation of the date of birth of the entity 111, a bit or bit string indicating whether the entity is above a certain age threshold (e.g., the minimum age to rent an automobile) or in a certain age category (e.g., under 18, between 18 and 25, over 25), and/or the like. Additionally, the identity attribute data may include the source of the date of birth data (e.g., visual inspection of a driver's license by the DI provider 121). In embodiments, the assertions model manager 131 may retrieve the identity attribute or otherwise obtain the identity attribute without communicating with the DI provider 121. In the context of a target entity's interaction with a digital indicator at a resource provider, the identity attribute data may be data representative (e.g., data file for a picture of a QR code, a data flag, etc.) of the interaction between the target entity's computer and the digital indicator at the resource provider.

For each type of assertion of the assertions model, at 250, a value of an assertion corresponding to the type of assertion can be calculated based on the identity attribute data associated with the entity. For example, the assertion model manager 131 can calculate the value of the assertion based on the data provided by the DI provider 121. For example, referring to the exemplary situation of asserting whether an entity 111 is old enough to rent an automobile as described above, the value for the assertion whether the entity 111 is old enough to rent an automobile can be calculated based on the date of birth information provided by the DI provider 121 using the following algorithm:
{"OfAgeToRentAutoInUSA"::="Yes" if "Current date"–"Verified date of birth"≥25 years else "No"}
where "OfAgeToRentAutoInUSA" is the assertion whether the entity 111 is old enough to rent an automobile in the USA, "Yes" is the value if the entity 111 is old enough, "No" is the value if the entity 111 is not old enough, "Current date" is the date on which the calculation is made, and "Verified date of birth" is the date of birth of the entity 111 as provided by the DI provider 121 after verification of the source of that data. Additionally or alternatively, an expiration date of the assertion can also be determined, or if the assertion will not expire, the expiration date can be omitted or the expiration data can have a value of null, "none," 0, and/or the like. In the context of a target entity's interaction with a digital indicator at a resource provider, the identity attribute data such as data representative (e.g., data file for a picture of a QR code, a data flag, etc.) of the interaction between the target entity's computer and the digital indicator at the resource provider can be used to calculate or determine an assertion value such as "yes" the target entity interacted with the digital indicator, or "no" the target entity did not interact with the digital indicator. The value can depend upon whether or not data representing the interaction is present.

For each type of assertion of the assertions model or for the complete set of assertions, at 260, a strength/confidence score associated with the value of the assertion(s) can be calculated based on the source of the identity attribute data. For example, the confidence score can be calculated based on the list of valid sources. Additionally or alternatively, the confidence score can be calculated based on a standardized or canonical method for calculating strength. For example, the confidence score can be calculated according to the technique described in NIST Special Publication 800-63A, Digital Identity Guidelines: Enrollment and Identity Proofing Requirements, U.S. Department of Commerce (updated Nov. 15, 2017), available at https://doi.org/10.6028/NIST.SP.800-63a, the disclosure of which is hereby incorporated herein in its entirety.

For each type of assertion of the assertions model, at 265, an assertion can be created. Each assertion can include the value of the assertion and/or additional data associated therewith, including but not limited to the name of the assertion, the strength/confidence score of the assertion, an expiration date of the assertion, and/or the like. Additionally, the assertion can be added to a temporary set of assertions that is stored while the full set of assertions corresponding to the assertions model is completed. In embodiments, the assertions may be generated and associated with an identifier for the entity 111 such that recall for the assertions associated with the entity 111 can be mapped via the identifier. In the context of a target entity's interaction with a digital indicator at a resource provider, the assertion "yes, the target entity interacted with the digital indicator" or "no, the target entity did not interact with the digital indicator" could be created.

For each type of assertion of the assertions model, at 270, a determination regarding whether there are remaining types of assertions in the assertions model for which an assertion has not yet been created can be made. If there is at least one remaining type of assertion, the next type of assertion can be selected and the process can be repeated starting from 220.

At 280, assertions data associated with a set of assertions can be transmitted. The set of assertions can include an assertion (e.g., the value of the assertion) corresponding to each type of assertion of the assertions model. For example, the assertions data associated with the set of assertions can be communicated from the assertions model manager 131 to the relying entity 161. Additionally or alternatively, the assertions model manager 131 can write the assertions data associated with the set of assertions to the ledger of assertions 141. For example, the ledger of assertions 141 can be a distributed letter including a blockchain. Additionally or alternatively, the assertions data associated with the set of assertions can be transmitted/written using at least one of a digital signature/cryptographic key of the entity 111 or the DI provider 121. For example, the assertions data can be written to a distributed ledger using the cryptographic keys of the entity 111 and the DI provider 121 across all assertions.

At 290, an event log can be updated. For example, the assertions model manager 131 can generate an event in the event log 151, and the event can be associated with the transmission of the set of assertions. Illustratively, data associated with the event in the event log 151 can include an event type (e.g., from a standardized and/or canonical list of assertion updates), an event value (e.g., associated with the event type in the standardized and/or canonical list of assertion updates), an event date/time, an identifier of the entity 111 (e.g., the cryptographic key of the entity 111), an identifier of the DI provider 121 (e.g., the cryptographic key of the DI provider 121), an identifier of the relying entity 161 (e.g., the cryptographic key of the DI provider 121), an identifier of a third party facilitator or technology provider (if any), and/or the like. In embodiments, the entity 111 may provide at least one source of identity attribute data 111c to the assertions model manager 131. The assertions model manager 131 may validate the source(s) of identity attribute data 111c, and if valid, crates a DI for the entity 111 to be stored a database or event log 151. Additionally or alternatively the assertions model manager 131 may transmit a ticket to the relying entity 161 which confirms identification of the identity attribute queried for on behalf of entity 111 to complete a transaction as described herein.

Figure 3:
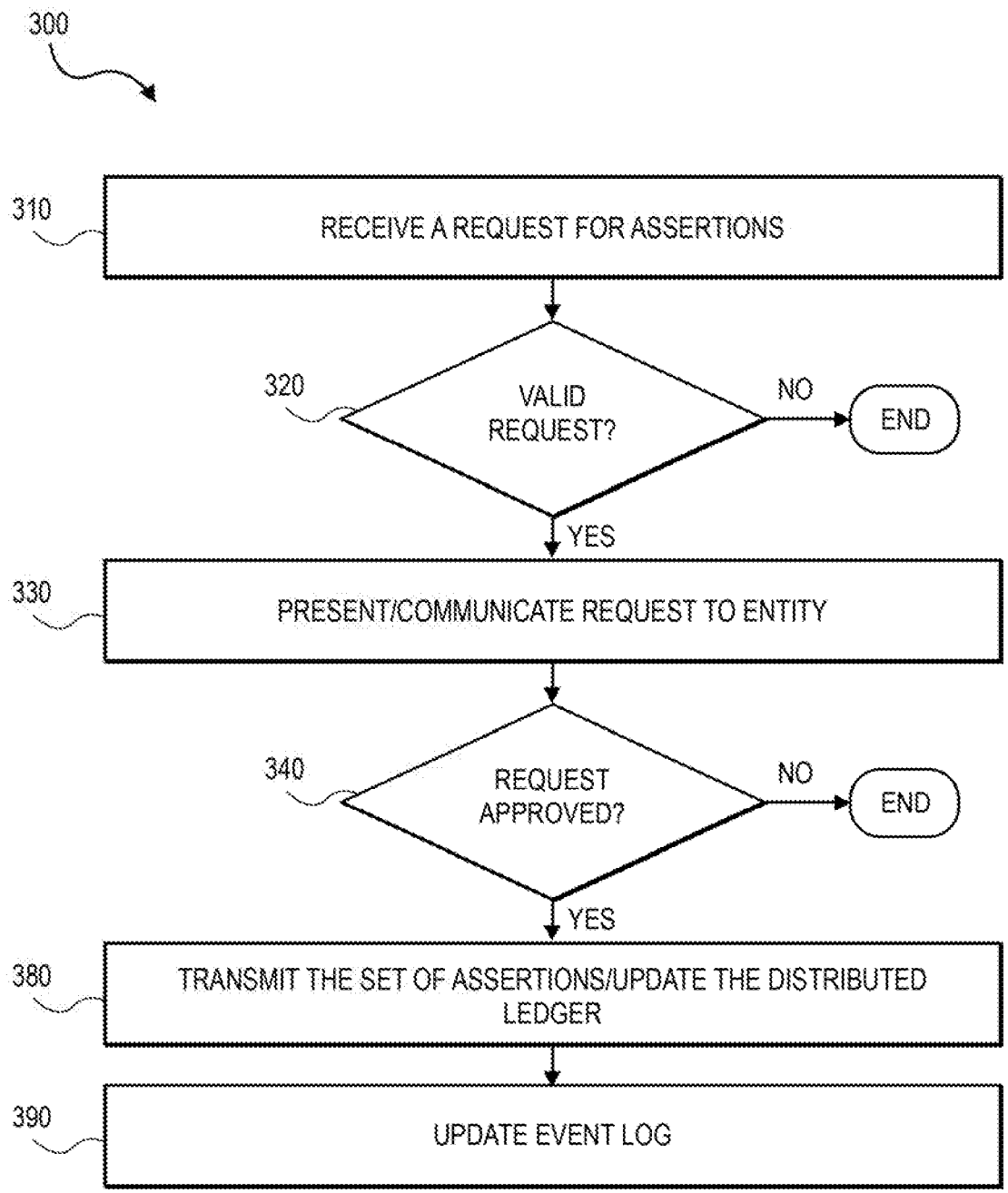
FIG. 3 is a flow diagram for a method of providing at least one assertion according to an embodiment.

Referring now to FIG. 3, a flow diagram of a method 300 for providing at least one assertion is shown according to an embodiment. The exemplary system 100 of FIG. 1 can be discussed with reference to the exemplary method 300 of FIG. 3. Additionally, the method 300 of FIG. 3 can be used in conjunction with, simultaneously with, before, after, or as an alternative to the method 200 of FIG. 2. At 310, a request for assertions can be received. For example, the assertions model manager 131 can receive the request for assertions from the relying entity 161. For example, the request can include first identification data identifying the relying entity 161 (e.g., the cryptographic key of the relying entity 161), second identification data identifying the relying entity 111 (e.g., the cryptographic key of the entity 111), entity type data identifying a type of entity associated with the relying entity 161 (e.g., a merchant category code (MCC) and/or the like), and assertions request data associated with at least a subset of the type(s) of assertion(s) in an assertions model. Additionally or alternatively, before communicating the request for assertions, the relying entity 161 can present its identifier (e.g., the cryptographic key of the relying entity 161) and/or its entity type (e.g., MCC) to the assertions model manager 131, and the assertions model manager 131 can communicate a set of assertions that the relying entity 161 is permitted to request, for example, based on its entity type and/or the like. Such a communication to determine the set of assertions the relying entity 161 is permitted to request can also be logged in the event log 151 (e.g., the assertions model manager 131 can update the event log, as described herein). For example, referring to the example of assertion type of whether an entity 111 is old enough to rent an automobile as described above, the relying entity 161 can be permitted to request information on whether the entity 111 is old enough to rent a car, has a valid driver's license, has (a) valid payment token(s), and/or the like. Illustratively, if the relying entity 161 is a bar/restaurant, the relying entity can be permitted to request whether the entity 111 is old enough to purchase alcohol, has (a) valid payment token(s), and/or the like.

At 320, a determination can be made whether the request is valid. For example, the assertions model manager 131 can validate the first identification data identifying the relying entity 161, the entity type data identifying the type of entity associated with the relying entity 161, and the subset of the type(s) of assertion(s) in the assertions model. For example, the assertions model manager 131 can confirm that the entity type matches a predetermined entity type associated with the first identification data identifying the relying entity 161. Additionally or alternatively, the assertions model manager 131 can confirm that the subset of assertions requested by the relying entity 161 is permitted based on the entity type. Additionally or alternatively, the assertions model manager 131 can determine a strength/confidence score associated with the identification data of the relying entity 161. If the request is not valid, the process can end. Additionally or alternatively, a notification can be sent to the relying party 161 including information regarding why the request is invalid. The assertions model manager 131 can validate the first identification data identifying the relying entity 161 to confirm that the relying entity 161 is approved to request assertions for an entity 111.

At 330, if the request from the relying entity is valid, a notification can be transmitted to the entity. In some embodiments, the notification can include data identifying the relying entity 161, the entity type of the relying entity 161, the subset of the type(s) of assertion(s) requested, the strength/confidence score associated with the relying entity 161, or the like. At 340, a determination can be made whether the request is approved by the entity 111. In some embodiments, the entity 111 can transmit and the assertions model manager 131 can receive a confirmation from the entity 111 that the assertions model manager 131 is approved to transmit response data associated with the subset of the set of assertions to the relying entity 161 as requested.

At 380, assertions data associated with a set of assertions can be transmitted. For example, the assertions data can be transmitted similar to as described above with reference to FIG. 2 at 280.

At 390, an event log can be updated. For example, the event log can be updated similar to as described above with reference to FIG. 2 at 290. Additionally or alternatively, an event generated in the event log can be associated with the request for the subset of assertions, which can be the same event or a different event than the event associated with the transmission of the assertions. Upon reception of the subset of assertions, the relying entity 161 can determine whether to proceed with the interaction (e.g., a payment transaction and/or non-payment interaction).

Figure 4:
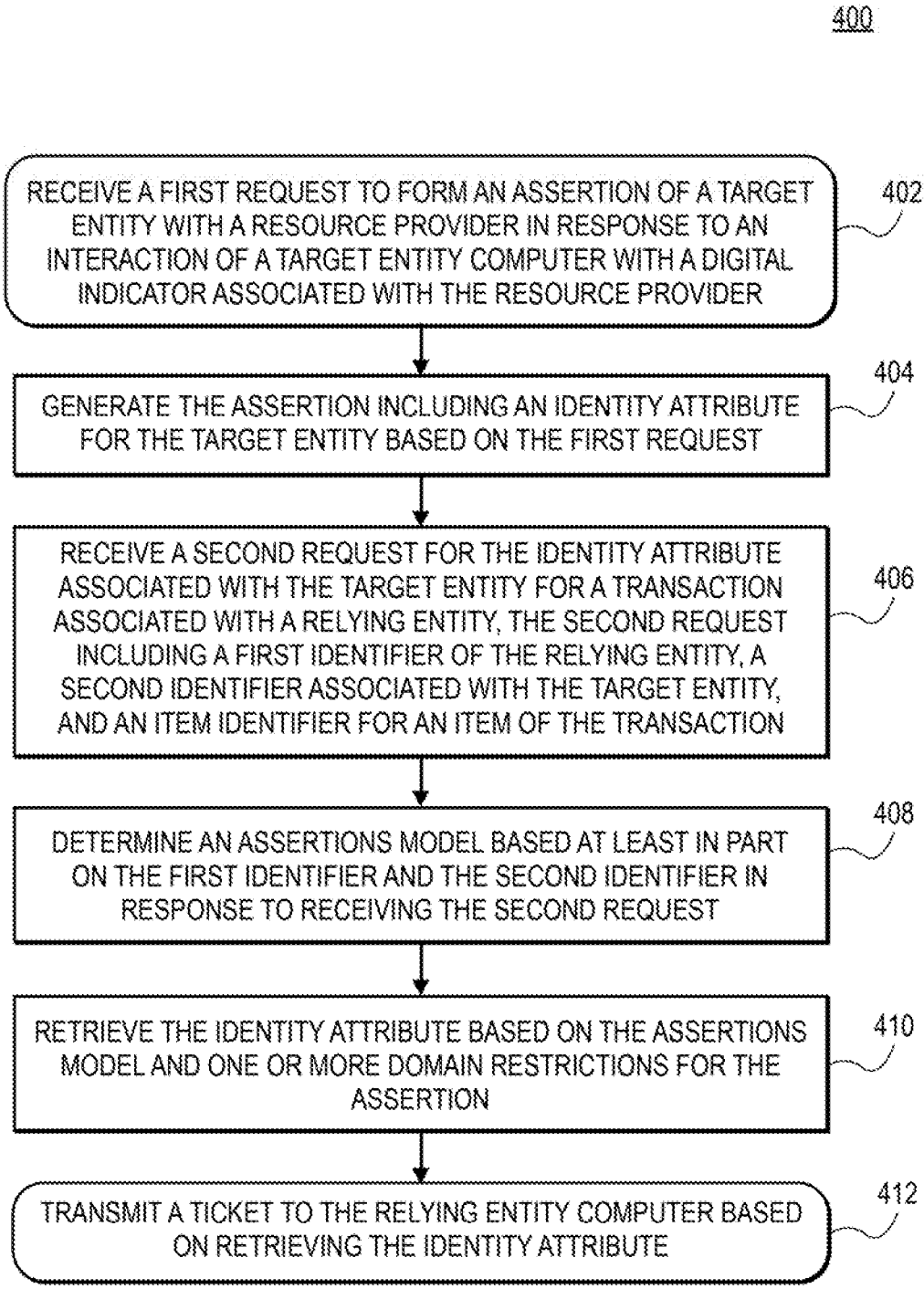
FIG. 4 is a flow diagram for a method of providing at least one assertion including a digital coupon, according to an embodiment.

FIG. 4 is a flow diagram for a method of providing at least one assertion including a digital coupon, according to an embodiment. FIG. 4 is best understood in the context of the example system 100 shown in FIG. 1, which in some embodiments, may be adapted for providing assertions related to providing a digital coupon for an item in a transaction. With reference to FIG. 4, the entity 111 may be referred to as a target entity. The assertion may be associated with an identity or account of a target entity based on the target entity, utilizing an associated target entity computer, interacting with a digital indicator associated or provided by a resource provider for an item offered by the resource provider. In embodiments, a digital indicator may include an object that may be scanned, read, communicated with, or otherwise interacted with by a target entity computer. Examples of a digital indicator may include a quick response (QR) code, a near field communication (NFC) tag, a Bluetooth enabled object, or other suitable electronic data object that can communicate with a target entity computer. A target entity may use a target entity computer to interact with the digital indicator associated with a resource provider and/or an item to generate an assertion of the interaction that is associated with the target entities' identity or account. The assertion may represent a digital coupon or discount for the item when provided by a merchant or relying entity for the item during a payment and clearance process or when completing a transaction on behalf of a target entity.

The example system 100 may be adapted for use in a scenario involving a relying entity 161 seeking to determine whether an assertion for the digital coupon or discount is associated with an entity 111 initiating a transaction for an item. Traditionally, users may utilize mail in rebates to receive a discount on an item. However, this traditional approach may not be as effective for obtaining the discount for the user as users are unable or unwilling to mail in the rebate to receive the discount; and utilizing mail in rebates may provide disconnected information regarding how the rebate was obtained (e.g., location and time). Moreover, traditionally results or analysis of discount campaigns are difficult to obtain and identify the effectiveness of the discount campaign. However, in the embodiments described herein corresponding to the digital coupon assertion, entities other than a relying entity requesting whether an assertion exists may be provided with information regarding the obtaining and redeeming of the digital coupon/assertion. For example, entities offering digital coupons or discounts such as merchants, brick-and-mortar stores, or manufacturers, may receive information from the assertions model manager 131 that identifies where a user obtained the assertion, for what item was the assertion associated with, and where did the user ultimately redeem the assertion. The information associated with the redemption of the assertion (digital coupon or discount) can aid entities in determining the effectiveness of a digital discount campaign and also aid in identifying specific markets or merchants to provide future digital discounts to drive further sales for particular items. In embodiments, the example system 100 can be adapted for associating an assertion with an account or an identity of the user for use in obtaining a discount or digital coupon for an item associated with the assertion. In embodiments, the assertions model manager 131 may generate and transmit a notification or message to a resource provider that generated a digital indicator and digital coupon pair when the request for the assertion of eligibility for the digital coupon is received on behalf of an entity 111. As described herein, the notification or message to the resource provider may include the identity of the resource provider where the digital coupon is utilized, a location of the resource provider, an identity of the entity 111, and/or item information such as an item SKU that corresponds to the item included in the transaction for which the digital coupon was requested.

In embodiments, the relying entity 161 may request, on behalf of an entity 111 initiating a transaction for an item, whether an assertion for the item and the entity 111 exists. The assertion for the item and the entity 111 may include the assertion between the entity 111 and a particular resource provider. The entity 111 may provide the relying entity 161 with an identification of themselves such as by interacting with the relying entity 161 with a target entity computer (e.g., a user device) or by communicating with the relying entity 161 with an application of the target entity computer. As described herein, the entity 111 may have previously utilized the target entity computer to interact with a digital indicator associated with a resource provider such as by scanning a QR code in a location of the resource provider, such as at a brick and mortar store of the resource provider. In embodiments, the digital indicator may be associated with a location of the resource provider or the digital indicator may be associated with a particular item offered by the resource provider. An application of the target entity computer may transmit the information obtained by the QR code (e.g., resource provider identifier, item stock keeping unit (SKU) or other item identifier) as well as information about the device and entity 111 (e.g., target entity identifier and device information) to the assertions model manager/API 131. In accordance with at least one embodiment, the assertions model manager/API 131 may generate and associate an assertion which represents the interaction by the entity 111 with the digital indicator for the identity of the entity 111 stored by the assertions model manager/API 131. In embodiments, the assertion may be used to generate a discount or digital coupon that represents a digital prepaid card for the item that is redeemable or usable by the entity 111 only. In embodiments, the entity 111 is prohibited from transferring or allowing other entities to utilize the digital coupon tied to the assertion for the entity 111 and maintained by the assertions model manager 131.

A relying entity 161 may submit a request for an identity attribute on behalf of the entity 111 to determine eligibility of a digital coupon for an item included in a transaction conducted between the relying entity 161 and the entity 111. Note that the relying entity 161 submitting the request for the digital coupon assertion may be the resource provider that provided the digital indicator or it could be a different resource provider that does not provide digital indicators and therefore does not offer digital coupons for the item. By utilizing the systems and methods described herein, a resource provider can incentivize entities to interact with provided digital indicators to access digital coupons which may be redeemed at different resource providers offering the same item. In exchange for entities interacting with the provided digital indicators the resource provider that offers the digital coupons can receive information which may be used to determine conversion of marketing schemes or influence of particular locations of brick and mortar stores in a geographic location. The resource providers may receive such information upon an entity 111 performing a transaction for an item associated with the digital indicator and the relying entity 161 submitting the request for the assertion for the digital coupon on behalf of the entity 111. An entity, such as entity 111 may conduct transactions more efficiently as no further interaction by the entities' computer (a target entity computer) may be required to notify a resource provider or relying entity 161 of their previous interaction with a digital indicator which made them eligible for a digital coupon or prepaid card that can be used in a transaction being conducted by the entity 111. Moreover, the entity 111 will not have to browse or scroll through multiple user interfaces to locate and utilize the assertion that indicates that the entity 111 is eligible for the digital coupon or prepaid card that can be used in a transaction being conducted by the entity 111. Instead, the relying entity 161 and the assertions model manager 131 can utilize the identifier of the entity 111 to determine that the entity 111 is eligible for the discount and apply the discount for the transaction without any further action by the entity 111.

In embodiments, the request from the relying entity 161 may include an identifier for the relying entity 161, an identifier for the entity 111, and transaction information such as an item SKU for the item in the transaction. The request may be provided from the relying entity 161 to the assertions model manager 131 which can use the information in the request to look up or identify any assertions associated with the identity of the entity 111 and the item and/or relying entity 161. In some embodiments, the relying entity 161 may hash or encrypt any information prior to transmitting it to the assertions model manager 131. For example, the relying entity 161 may hash or encrypt the identifiers for the relying entity 161 as well as the entity 111 and send the hashed or encrypted information to the assertions model manager 131. The assertions model manager 131 can take the hashed or encrypted information and compare it against the hash of identifiers that are on-file with the assertions model manager 131 or decrypt the encrypted information using a private key maintained by the assertions model manager 131. A matching comparison would indicate that the identifiers are recognized and can be used to identify any assertions associated with the entity 111.

The assertions model manager 131 may have on-file or maintain a number of assertions that are associated with the entity 111. For example, the entity may have used a target entity computer to interact with a plurality of digital indicators provided by several different resource providers. Each interaction between the target entity computer and the digital indicator may form a new assertion which corresponds to a digital coupon that can be redeemed during a transaction for an item offered by the same resource providers. The assertions model manager 131 may have information regarding whether the entity 111 has any assertions associated with themselves and the particular resource provider and/or item included in a transaction. The assertions model manager 131 may maintained information identifying whether an assertion has already been redeemed (e.g., the prepaid card or ticket associated with the prepaid card has already been provided to the relying entity 161).

The assertions model manager 131 can return the assertion or a ticket indicating that the assertion does exist for the discount, digital coupon, or prepaid card to the relying entity 161. The assertion can serve as proof of specific, pre-configured facts (e.g., the user device associated with a user has previously interacted with a digital indicator associated with the item included in the transaction information). In embodiments, the relying entity 161 may provide the ticket to a payment processing network during a clearance and settlement process to complete a transaction which corresponds to a payment request for redeeming the prepaid card associated with the assertion between the entity 111 of the transaction and a given resource provider that provided the digital indicator as described herein.

In one real-world example, a resource provider may be an entity seeking to provide a discount or digital coupon to a target entity attempting to purchase an item. For instance, the resource provider may be a merchant offering a pair of basketball shoes. To provide a discount for the basketball shoes the resource provider may form a pre-established relationship with the assertions model manager 131 to provide a digital coupon to specified entities that interact with a digital indicator provided by the resource provider for the basketball shoes. The assertions model manager 131 may form an assertion for an entity 111 that interacts with the digital indicator provided by the resource provider that includes an identifier for the entity 111 and a resource provider location or a specific item offered by the resource provider as indicated by the digital indicator. The assertion of this interaction can be utilized to provide a digital coupon upon the entity 111 providing their identity (identifier) during a transaction for the item at the resource provider or at a different resource provider (e.g., at the location of the relying entity 161, a different relying entity of a different location, or a resource provider at a different location). If an assertion exists, the assertions model manager 131 may provide a ticket to the relying entity 161 which can be redeemed or otherwise provided during clearance and settlement of the transaction for a token associated with a prepaid card that corresponds to the assertion and is associated with the entity 111 upon the interaction with the digital indicator of the item. By utilizing the token associated with the assertion and any other payment information or payment account provided by the entity 111 a split payment process may be initiated where the entity 111 pays for a portion that is less than the original price for the item and the token associated with the assertion is paid for by an acquirer that generates the assertion and corresponding digital indicator.

In embodiments, the assertions model manager 131 may use the identifier of an entity 111 included in a request to identify assertions associated with the entity 111 for a transaction in which an assertion request is received from a relying entity 161. In embodiments, the assertions model manager 131 may contact a financial entity (e.g., DI provider 121) associated with the entity 111 and provide the identifier of the entity 111 in order to have the financial entity (e.g., DI provider 121) return assertions associated with interactions by the corresponding target entity computer of the entity 111 with digital indicators associated with items and/or resource providers. In embodiments, the assertions model manager 131 may have previously received assertions from the financial entity (e.g., DI provider 121) regarding interactions by the target entity computer with digital indicators associated with items, and the assertions model manager 131 may retrieve or locate those assertions based on the identifier of the entity as well as the transaction information included in the request such as item information (e.g., an item SKU) or an identifier of the relying entity. The assertions may be a set of true/false or yes/no statements.

In embodiments, the assertions model manager 131 may collect only the assertions that are relevant to the entity 111, the relying entity 161, and/or the item included in the transaction. The specific set of relevant assertions may be defined in advance in an assertions model that can be based on the particular relying entity 161 or according to one or more domain restrictions. In embodiments, a domain restriction may be one or more sets of rules that are associated with a potential assertion in response to an entity using a target entity computer to interact with a digital indicator of an item or resource provider. For example, domain restrictions may include assertions available for specific items (e.g., specific item SKUs), specific relying entities (e.g., a whitelist set of relying entities which may request and receive assertions), or date restrictions which may indicate a time range that an assertion is valid for redeeming. Thus, the assertions model manager 131 may provide requested information back to the relying entity 161 without endangering the privacy rights of the individual and can initiate the provisioning of a discount, digital coupon, or prepaid card for the item without any further action required by the entity 111 such as mailing of a rebate. Once the relying entity 161 receives confirmation of the assertion associated with the entity 111 for the item included in a transaction, a digital coupon or discount may be applied for the item and the entity 111 may purchase the item at a reduced cost as a result of the previous interaction with the digital indicator associated with the same item at some previous point and at some location which could be a different location than the relying entity 161 conducting the transaction.

The flow diagram of FIG. 4 can best be understood from the point of view of the assertions model manager 131, as described in the previous example. The assertions model manager 131 may be implemented by a server computer.

In embodiments at block 402, an assertion generation is initiated by receiving a first request to form an assertion of a target entity with a resource provider in response to an interaction of a target entity computer with a digital indicator associated with the resource provider. A target entity may utilize a target entity computer to interact with a digital indicator associated with an item (e.g., scan a QR code of an item) to transmit information including an identifier of the target entity, the item interacted with, a resource provider offering the item, and an indication of the interaction to the assertions model manager. If an assertion has not already been associated for this item and/or resource provider and the target entity, then the assertions model manager may associate the assertion with the identifier of the target entity. In embodiments, the identifiers of the target entity and resource provider, item information, and any other suitable information included in the digital indicator, and the indication of the interaction may be transmitted via an application of the target entity computer, such as an application of a mobile device, to the assertions model manager via a network such as the Internet. The assertions model manager may collect this information, but in some embodiments, this information is not stored in plain text. For example, some or all of the information can be hashed or encrypted. Additionally, some or all of the collected information can be tokenized.

In some embodiments, a copy of a token that represents the assertion can be provided to the individual (e.g., for storage on their user device) to allow the individual to use that token while conducting a transaction for the item associated with the assertion. Thus, the individual can attach a token for the payment account to their identity and conduct a transaction for the item associated with the assertion. More specifically, the token can contain information for redeeming a prepaid card.

In embodiments, at block 404, the assertions model manager may generate the assertion including an identity attribute for the target entity based at least in part on the first request.

In some embodiments, at block 406, a second request for the identity attribute associated with the target entity for a transaction associated with a relying entity may be received. The second request may include a first identifier of the relying entity, a second identifier associated with the target entity, and an item identifier for an item of the transaction. In embodiments, the target entity may have provided a saved token from their target entity computer (e.g., stored when the user established the assertion) in lieu of manually entering information about their identity or identifier to conduct the transaction.

In embodiments, at block 408, an assertions model may be determined based at least in part on the first identifier and the second identifier in response to receiving the second request. In embodiments, the assertions model manager determines an assertion model for the relying entity based on the received identifier of the relying entity. The assertions model manager may have a variety of pre-configured assertion models, one of which may be associated with that particular relying entity. Thus, the assertions model manager will use the identity of the relying entity to look up the appropriate assertion model in order to determine which assertions that relying entity is entitled to receive. The assertion model manager may also identify and apply appropriate domain restrictions to identifying appropriate assertions as described herein based on the identifier of the relying entity or the item information.

In embodiments, at block 410, the assertions model manager may retrieve the identity attribute based at least in part on the assertions model and one or more domain restrictions for the assertion. If an assertion exists within the assertions model manager for the target entity and the item of the transaction then the assertions model manager may retrieve the identity attribute indicating the eligibility of a digital coupon for the transaction.

In embodiments, at block 412, For example, the assertions model manager may provide a ticket which indicates that the assertion exists and which can be provided by the relying entity to an acquirer or issuer for redeeming an associated prepaid card for clearing and settling the transaction as described herein.

Figure 5:
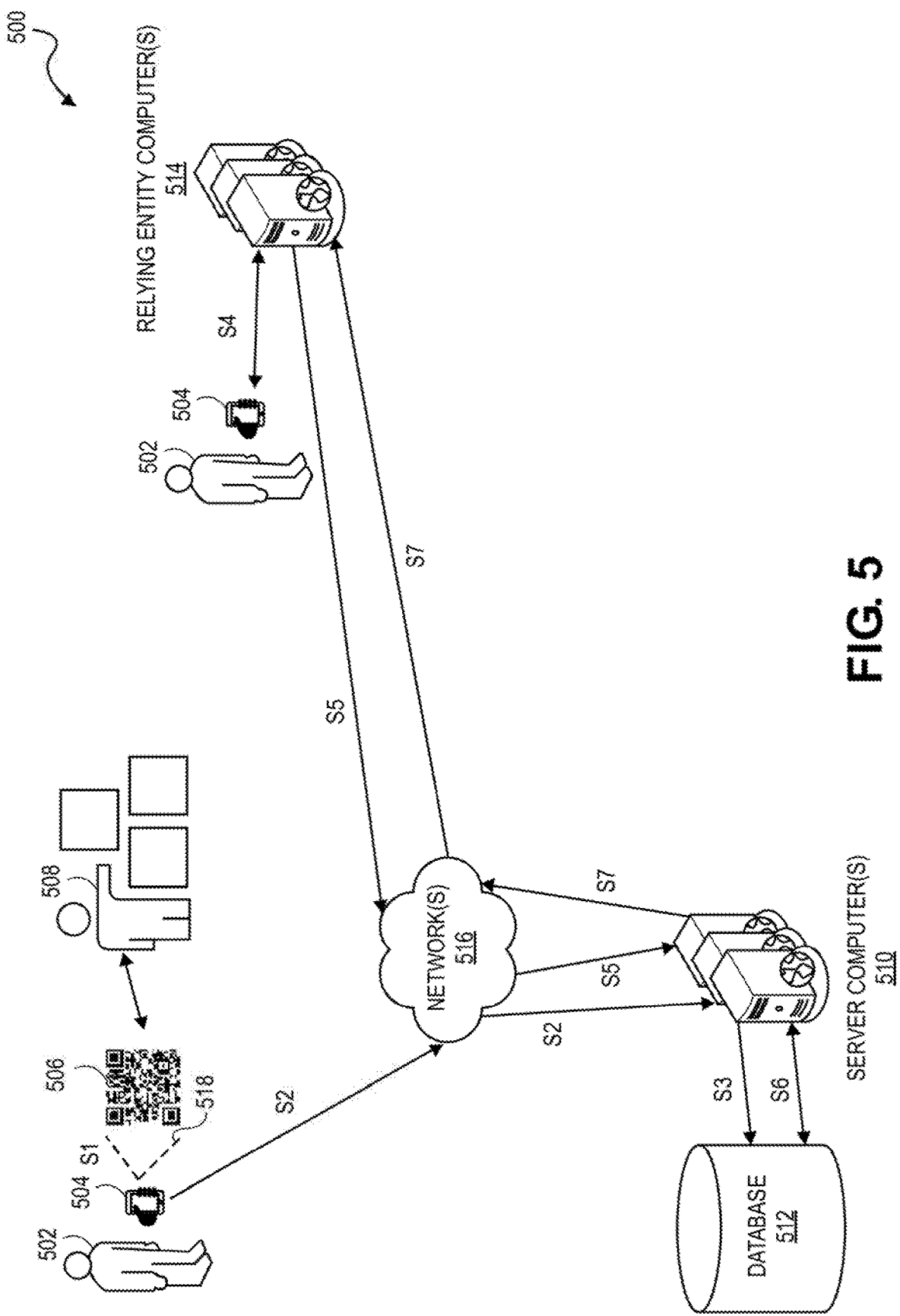
FIG. 5 is a work flow diagram for providing at least one assertion including a digital coupon, according to an embodiment.

FIG. 5 is a work flow diagram for providing at least one assertion including a digital coupon, according to an embodiment. The workflow of FIG. 5 includes a target entity 502 using a target entity computer 504 to interact with a digital indicator 506 provided by a resource provider 508 to generate an assertion maintained by server computer 510. In embodiments, the server computer 510 may implement the assertions model manager 131 of FIG. 1. The target entity 502 may be entity 111 of FIG. 1. In accordance with at least one embodiment, the server computers 510 may store an assertion associated with target entity 502 in a database such as database 512. Communications between the target entity computer 504, the server computer 510, and a relying entity computer 514 may be via network 516.

At step S1, the target entity 502 may utilize a target entity computer 504 to interact (518) with digital indicator 506 provided by resource provider 508 to initiate forming an assertion by providing a first request as described herein. For example, the target entity 502 may interact with a digital indicator 506 provided by resource provider 508 to receive a discount on a certain brand of t-shirts. Interacting 518 with the digital indicator 506 by the target entity computer 504 may include scanning of a QR code provided by the resource provider 508. As described herein, the resource provider 508 may provide a digital coupon or prepaid card for use in buying the certain brand of t-shirts at another retail location or resource provider.

At step S2, the target entity computer 504 transmits an identifier for the target entity 502, the indication of interaction between the target entity computer 504 and the digital indicator 506, as well as any information included in the digital indicator such as item information, resource provider, resource provider location, etc., in a message to server computer 510 via network 516.

At step S3, the server computer 510 may generate an assertion between the target entity 502 and the resource provider 508 or the item associated with the digital indicator 506 that is mapped or associated with the identifier of the target entity 502. The assertion may be stored in the database 512.

At step S4, the target entity 502 may utilize target entity computer 504 to conduct a transaction for an item with a relying entity via a relying entity computer 514. The transaction conducted with the relying entity may be a different resource provider than resource provider 508 that provided the digital indicator 506 and digital coupon or prepaid card incentive assertion described herein.

At step S5, the relying entity computer 514 may generate a request (a second request) for an identity attribute for the target entity 502 conducting the transaction for the item. The identity attribute may correspond to an assertion for the target entity 502 that is identified by the identifier associated with the target entity 502 and represents the interaction between the target entity computer 504 and the digital indicator 506. In embodiments, the second request may include a first identifier of the relying entity, a second identifier associated with the target entity 502, and an item identifier associated with the item of the transaction.

At step S6, the server computer 510 may determine the assertions model based at least in part on the first identifier and the second identifier in response to receiving the second request. The server computer 510 may retrieve the identity attribute based at least in part on the assertions model and one or more domain restrictions for the assertion from the database 512.

At step S7, the server computer 510 may transmit a ticket, via network 516 to relying entity computer 514 based at least in part on retrieving the identity attribute. As described herein, the ticket represents the eligibility for a digital coupon or prepaid card for use by the relying entity and associated with the target entity 602 for completing the transaction.

Other details regarding aspects of embodiments can be found in U.S. Provisional Patent Application No. 62/587,143, filed on Nov. 16, 2017, the disclosure of which is herein incorporated by reference in its entirety for all purposes.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method comprising:

receiving, by a server computer and from a target entity computer, a first request to form an assertion of a target entity associated with the target entity computer and a resource provider, the assertion request including an identity of the target entity and a location of the resource provider, the first request generated in response to an interaction of the target entity computer and a digital indicator associated with the resource provider;

generating, by the server computer, the assertion including an identity attribute for the target entity based at least in part on the first request, the identity attribute including the identity of the target entity and an indication of the interaction of the target entity computer and the digital indicator associated with the resource provider, wherein the assertion is a secure fact about the target entity;

receiving, by the server computer and from a relying entity computer, a second request for the identity attribute associated with the target entity for a transaction associated with a relying entity associated with the relying entity computer and the target entity, the second request including:
a first identifier of the relying entity;
a second identifier associated with the target entity; and
an item identifier for an item associated with the transaction;

determining, by the server computer, an assertions model based at least in part on the first identifier and the second identifier in response to receiving the second request, wherein the assertions model specifies one or more types of assertions that the relying entity is entitled to receive;

retrieving, by the server computer, the identity attribute based at least in part on the assertions model and one or more domain restrictions for the assertion; and transmitting, by the server computer and to the relying entity computer, a ticket based at least in part on retrieving the identity attribute.

2. The method of claim 1, wherein the ticket is utilized by the relying entity to complete the transaction.

3. The method of claim 2, wherein the ticket includes a digital coupon for the item.

4. The method of claim 1, wherein the one or more domain restrictions includes at least one of prohibiting the use of the ticket to a specific resource provider, prohibiting the use of the ticket to the specific resource provider and a specific item, restricting use of the ticket to one or more resource providers specified by an entity, or restricting use of the ticket to a certain time period.

5. The method of claim 1, further comprising transmitting, by the server computer and to a resource provider computer associated with the resource provider, a notification of usage of the assertion in response to receiving the ticket from the relying entity computer.

6. The method of claim 5, wherein the notification includes the resource provider, the location of the resource provider, the item identifier, and the identity of the target entity.

7. The method of claim 1, further comprising transmitting, by the server computer and to the relying entity computer, a payment token that corresponds to a discount for the item in the transaction in response to receiving the ticket from the relying entity computer.

8. The method of claim 1, wherein the second identifier associated with the target entity is maintained and provided in the second request by an application of the target entity computer.

9. The method of claim 1, further comprising transmitting, by the server computer and to the target entity computer, a notification that identifies generation of the assertion with the resource provider.

10. The method of claim 1, wherein the assertion is prohibited from being utilized by another entity.

11. A computer system comprising:
a processor; and
a memory element including instructions that, when executed with the processor, cause the system to at least:
receive, from a target entity computer, a first request to form an assertion of a target entity associated with the target entity computer and a resource provider, the assertion request including an identity of the target entity and a location of the resource provider, the first request generated in response to an interaction of the target entity computer and a digital indicator associated with the resource provider;
generate the assertion including an identity attribute for the target entity based at least in part on the first request, the identity attribute including the identity of the target entity and an indication of the interaction of the target entity computer and the digital indicator associated with the resource provider, wherein the assertion is a secure fact about the target entity;
receive, from a relying entity computer, a second request for the identity attribute associated with the target entity for a transaction associated with a relying entity associated with the relying entity computer and the target entity, the second request including:
a first identifier of the relying entity;
a second identifier associated with the target entity; and
an item identifier for an item associated with the transaction;
determine an assertions model based at least in part on the first identifier and the second identifier in response to receiving the second request, wherein the assertions model specifies one or more types of assertions that the relying entity is entitled to receive;
retrieve the identity attribute based at least in part on the assertions model and one or more domain restrictions for the assertion; and
transmit, to the relying entity computer, a ticket based at least in part on retrieving the identity attribute.

12. The computer system of claim 11, wherein the digital indicator includes a quick response (QR) code.

13. The computer system of claim 12, wherein the computer system implements an assertions model manager.

14. The computer system of claim 13, wherein the assertions model manager utilizes an application programming interface to receive the first request and the second request.

15. The computer system of claim 11, wherein the second identifier associated with the target entity includes the identity of the target entity.

16. The computer system of claim 15, wherein the one or more domain restrictions are specified by the resource provider.

17. The computer system of claim 11, wherein the location of the resource provider includes a geographical location of the resource provider.

18. The computer system of claim 11, wherein the second identifier associated with the target entity is maintained and provided in the second request by an application of the target entity computer.

19. The computer system of claim 11, wherein the identity attribute is retrieved from a digital identity provider.

20. A non-transitory computer-readable storage medium having stored thereon instructions that, when executed by a computer system, cause the computer system to at least:
  receive, from a target entity computer, a first request to form an assertion of a target entity associated with the target entity computer and a resource provider, the assertion request including an identity of the target entity and a location of the resource provider, the first request generated in response to an interaction of the target entity computer and a machine-readable code associated with the resource provider;
  generate the assertion including an identity attribute for the target entity based at least in part on the first request, the identity attribute including the identity of the target entity and an indication of the interaction of the target entity computer and the machine-readable code associated with the resource provider, wherein the assertion is a secure fact about the target entity;
  receive, from a relying entity computer, a second request for the identity attribute associated with the target entity for a transaction associated with a relying entity associated with the relying entity computer and the target entity, the second request including:
    a first identifier of the relying entity;
    a second identifier associated with the target entity; and
    an item identifier for an item associated with the transaction;
  determine an assertions model based at least in part on the first identifier and the second identifier in response to receiving the second request, wherein the assertions model specifies one or more types of assertions that the relying entity is entitled to receive;
  retrieve the identity attribute based at least in part on the assertions model and one or more domain restrictions for the assertion; and
  transmit, to the relying entity computer, a ticket based at least in part on retrieving the identity attribute.

* * * * *